US009797374B2

United States Patent
Wedel-Heinen

(10) Patent No.: US 9,797,374 B2
(45) Date of Patent: Oct. 24, 2017

(54) WIND TURBINES

(75) Inventor: Jens Jakob Wedel-Heinen, Charlottenlund (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 1120 days.

(21) Appl. No.: 13/811,960

(22) PCT Filed: Jul. 26, 2011

(86) PCT No.: PCT/DK2011/050291
§ 371 (c)(1),
(2), (4) Date: Mar. 29, 2013

(87) PCT Pub. No.: WO2012/013195
PCT Pub. Date: Feb. 2, 2012

(65) Prior Publication Data
US 2013/0189102 A1    Jul. 25, 2013

Related U.S. Application Data

(60) Provisional application No. 61/367,535, filed on Jul. 26, 2010.

(30) Foreign Application Priority Data

Jul. 26, 2010  (GB) .................................. 1012478.2

(51) Int. Cl.
*B64C 11/00*    (2006.01)
*F03D 7/02*    (2006.01)

(52) U.S. Cl.
CPC ......... *F03D 7/0224* (2013.01); *F03D 7/0288* (2013.01); *F05B 2240/2022* (2013.01);
(Continued)

(58) Field of Classification Search
CPC ...... F03D 7/022; F03D 7/0204; F03D 7/0288; F03D 11/04; F05B 2270/301; F05B 2270/324; F05B 2270/33
See application file for complete search history.

(56) References Cited

U.S. PATENT DOCUMENTS 8,131,402 B2 *  3/2012  Neumann ............. F03D 7/0288
                                                        290/44
8,319,361 B2 * 11/2012  Lucks .................. F03D 7/0268
                                                        290/44
(Continued)

FOREIGN PATENT DOCUMENTS

DE    EP 2182205 A1 *  5/2010  .......... F03D 7/0204
EP       1736663 A2   12/2006
(Continued)

OTHER PUBLICATIONS

International Search Report and Written Opinion dated Mar. 28, 2012 for International Application No. PCT/DK2011/050291, 11 pages.
(Continued)

*Primary Examiner* — Phutthiwat Wongwian
*Assistant Examiner* — Matthew T Largi
(74) *Attorney, Agent, or Firm* — Patterson + Sheridan, LLP

(57) ABSTRACT

An upwind wind turbine comprising a tower and a rotor is described. The wind turbine additionally includes a pressure-sensing device supported by the tower at a location within the wake of the rotor. The pressure-sensing device is configured to sense air pressure and provide a signal indicative of the sensed air pressure to a wind turbine controller for use in controlling the rotor of the wind turbine.

19 Claims, 6 Drawing Sheets

(52) U.S. Cl.
CPC ....... *F05B 2270/17* (2013.01); *F05B 2270/32* (2013.01); *F05B 2270/321* (2013.01); *F05B 2270/324* (2013.01); *F05B 2270/33* (2013.01); *Y02E 10/723* (2013.01)

(56) References Cited

U.S. PATENT DOCUMENTS

| | | | |
|---|---|---|---|
| 8,951,011 B2* | 2/2015 | Li | F03D 1/06 |
| | | | 416/1 |
| 2004/0057828 A1* | 3/2004 | Bosche | F03D 7/0204 |
| | | | 416/1 |
| 2010/0111668 A1* | 5/2010 | Kapich | F03D 1/04 |
| | | | 415/47 |
| 2013/0022442 A1* | 1/2013 | Nanukuttan | F01D 11/22 |
| | | | 415/1 |

FOREIGN PATENT DOCUMENTS

| | | | | |
|---|---|---|---|---|
| EP | 2182205 A1 | | 5/2010 | |
| GB | 2063374 A | * | 6/1981 | ............ F01D 11/22 |
| WO | 2008129112 A1 | | 10/2008 | |
| WO | 2009109467 A2 | | 9/2009 | |
| WO | 2010061255 A2 | | 6/2010 | |
| WO | 2011023774 A2 | | 3/2011 | |

OTHER PUBLICATIONS

GB Search Report dated Nov. 25, 2010 for Application No. GB1012478.2, 1 page.

\* cited by examiner

WIND TURBINES

TECHNICAL FIELD

The present invention relates to wind turbines and the control of wind turbines.

BACKGROUND

By way of background to the present invention, FIG. 1 and FIG. 1A show a prior art horizontal axis wind turbine 10 comprising a tower 11, a rotor 12 and a nacelle 13. The nacelle 13 is supported at an upper end 14 of the tower 11, which can be 100 meters above ground level 15 for a multi-megawatt turbine. The nacelle 13 houses the rotor shaft, generator and gearbox (if present). A wind-monitoring device 16 is located on top of the nacelle 13. The wind-monitoring device 16 includes an anemometer 17 for monitoring wind speed and a vane 18 for monitoring wind direction in a horizontal plane.

The rotor 12 is supported by the nacelle 13 and includes three rotor blades 19a, 19b, 19c. Only two blades 19a, 19b are shown in the side view of FIG. 1. However, all three blades 19a, 19b, 19c can be seen in the front view of FIG. 1A. Referring to FIG. 1A, the blades 19a, 19b, 19c are equally spaced about a central rotor hub 20, and extend radially from the hub 20 when viewed from the front, in a span direction from root 21 to tip 22. As the rotor 12 rotates, the tips 22 of the blades 19a, 19b, 19c sweep a circular area 23 known as the 'rotor disc', which is represented by a dashed line 24 in FIG. 1A, and a dashed vertical line 24 in FIG. 1.

Referring again to FIG. 1, the rotor 12 is mounted upwind of the tower 11 and faces directly into the wind, which is represented by arrows 25. The wind turbine 10 is therefore known as a horizontal axis 'upwind turbine'. The rotor 12 extracts energy from the wind as it rotates. This causes a reduction in wind speed downstream of the rotor 12. The area of reduced wind speed is commonly referred to as the 'wake' of the rotor 12. The wake spreads out with increasing distance from the rotor 12, and is represented by the dotted lines 26 in FIG. 1. The wind turbine 10 includes a yaw mechanism (not shown) for turning the nacelle 13 about a vertical yaw axis 27 to keep the rotor 12 facing into the wind with changing wind direction.

The wind turbine 10 typically includes a pitch mechanism (not shown), located within the rotor hub 20, for turning or 'pitching' the blades 19a, 19b, 19c about their longitudinal axes 28. Pitching the blades 19a, 19b, 19c varies the angle of attack (and hence the lift) of the blades 19a, 19b, 19c, which allows the rotor speed to be maintained within predefined operating limits despite changing wind speeds. In addition to controlling rotor speed, blade pitching is used to smooth out variations in loading and torque as described below.

The blades 19a, 19b, 19c of the rotor 12 experience significantly different wind velocities at different points within a rotational cycle because wind speed generally varies with height. For example, the upwardly-extending blade 19b in FIG. 1 may experience a faster wind speed and hence greater lift than the downwardly-extending blade 19a. To compensate for differences in wind speed with height, some modern wind turbines employ 'cyclic pitch control' to vary the angle of attack of the blades continuously during a rotational cycle. So, for example, the angle of attack of a blade may be increased as the blade passes the tower to increase the lift generated by a downward-pointing blade 19a. Cyclic pitching ensures that the blades provide substantially the same lift at all points in the rotational cycle, such that the blades 19a, 19b, 19c are exposed to substantially the same flapwise bending moments during a rotor cycle and fatigue and extreme loads on the complete wind turbine system are reduced.

The wind turbine 10 includes a wind turbine control system which, amongst other things, controls the yaw and pitch mechanisms. The wind turbine control system includes a controller 29 that receives signals indicative of wind speed from the anemometer 17, and wind direction from the vane 18, and calculates the required variations for yaw and pitch. A model linking the estimated variation of wind speed and direction with height is employed to determine the requisite parameters for cyclic pitch control based upon the wind-speed readings from the anemometer 17.

Whilst existing wind turbine control systems work well, there is a continual drive to produce more sophisticated control systems and control strategies. Indeed, it is an aim of the present invention to provide a more sophisticated wind turbine control system that better handles some other technical challenges that will now be explained.

The blades of modern wind turbines are inherently flexible and can bend significantly in use. As the blades are long, in excess of 50 meters in many cases, any flexing or bending of the blades may translate into considerable displacement of the tips of the blades out of the rotor disc in the wind direction. For upwind turbines, wind loading will tend to force the blades towards the tower. Flexing of the blades in this way presents a risk of a collision between the blades and the tower in extreme conditions. The risk is greatest in cases of 'negative' wind shear, i.e. when the wind speed is higher in the lower part of the rotor disc than in the upper part.

In order to prevent the blades from colliding with the tower, modern wind turbines are designed to ensure that the clearance between the tip of the blade and the tower, i.e. the 'tip-to-tower' distance (represented by the double-headed arrow 30 in FIG. 1), remains within predefined safe limits. To this end, several measures are presently employed:

Firstly, the blades 19a, 19b, 19c may be pre-bent so that they curve away from the tower 11 moving in the span direction from root 21 to tip 22, but straighten when under load. Without pre-bending, the tips 22 of the blades 19a, 19b, 19c could bend undesirably close to the tower 11 when under load.

Secondly, the nacelle 13 and rotor 12 are tilted as shown in FIG. 1, such that a rotor axis 31 about which the rotor 12 turns is inclined upwardly into the wind with respect to a horizontal axis 32. The extent of tilt is defined by a 'tilt angle', which is the angle between the rotor axis 31 and the horizontal 32. Tilting the rotor 12 in this way increases the clearance between the tower 11 and the tips 22 of the blades 19a, 19b, 19c.

Thirdly, the blades 19a, 19b, 19c are inclined dihedrally in the span direction away from the tower 11 moving from root 21 to tip 22. This is known as 'coning' because the blades sweep a cone-shaped area. The extent of coning is defined by a 'cone angle', which is the angle between the longitudinal axis 28 of the blades 19a, 19b, 19c along the span direction, and the rotor disc 24. When the rotor 12 is not tilted, the cone angle is simply the angle between the longitudinal axis 28 of a blade 19a, 19b, 19c and the vertical yaw axis 27 about which the nacelle 13 turns. It should be noted that the extent of coning shown in FIG. 1 has been greatly exaggerated to improve understanding of the present invention.

Fourthly, the blades 19a, 19b, 19c incorporate structural features to increase their rigidity and reduce their propensity to bend towards the tower 11 to an extent beyond that desirable to compensate for any pre-bending.

Excessive pre-bending, tilt and coning can reduce the performance and hence reduce the efficiency of the wind turbine. In addition, excessive pre-bending can make blades difficult to manufacture and problematic to transport. Furthermore, increasing the rigidity of the blades generally means increasing the weight of the blades and hence increasing the size and weight of other wind turbine components that must support the heavier blades. This increases the cost of the wind turbine and may further reduce its performance and efficiency.

SUMMARY OF THE INVENTION

In accordance with the present invention, there is provided an upwind wind turbine comprising: a tower; a rotor; and a pressure sensing device configured to sense air pressure and provide a signal indicative of the sensed air pressure to a wind turbine controller for use in controlling the rotor of the wind turbine, wherein the pressure sensing device is supported by the tower at a location within the wake of the rotor.

Supporting the pressure-sensing device by means of the tower allows the pressure-sensing device to be positioned within the wake of the rotor at a level corresponding to the lower half of the rotor disc. The signal from the pressure-sensing device may be transformed into signals indicative of wind speed and wind direction at the tower, within the wake of the rotor at a level corresponding to the lower half of the rotor disc. Suitable filtering and/or correction may be applied to the signals to remove turbulent effects caused by the rotor, in order to arrive at the ambient wind speed and wind direction at the tower. Knowledge of these parameters allows more sophisticated rotor-control algorithms to be employed.

The present invention allows the wind turbine control system to optimise the target power for the lower part of the rotor disc more effectively than prior art systems. For example, in the case of cyclic pitch control, actual values of wind speed and wind direction in the lower half of the rotor disc can be utilised instead of estimates derived from anemometer and vane measurements at the top of the tower. Ultimately, this allows the wind turbine to be operated more efficiently.

Preferably the pressure-sensing device is at least as far from the rotor axis as the longitudinal midpoint of a blade. This allows the tip-to-tower distance to be monitored as the blade passes the tower. The most effective tip-to-tower measurements can be obtained when the pressure-sensing device is mounted at a height substantially corresponding to the height of the lowest part of the rotor disc.

For a given wind speed, rotor speed and pitch angle, the tip-to-tower distance can be inferred from the shape of a pressure pulse or surge in the signal from the pressure sensing device. To this end, the wind turbine control system may access a look-up-table, or parametric model, that stores correlations between the shape of pressure peaks and the tip-to-tower distance for numerous combinations of wind speed, rotor speed and pitch angle.

The tip-to-tower distance may be utilised as a constraint in the wind turbine control algorithms. For example, the control system may be configured to maintain the tip-to-tower distance within predefined limits. In addition, the control system may be configured to take action to increase the tip-to-tower distance in the event that the tip-to-tower distance becomes too small. This may be achieved, for example, by pitching a blade out of the wind to reduce lift when it passes the tower, or by increasing the speed of the rotor.

Dynamic knowledge of the tip-to-tower distance, and the ability to adjust it dynamically if required, is particularly advantageous because it provides more flexibility over the design of wind turbines.

Prior art wind turbines are designed with high structural safety margins to accommodate 'worst-case' scenarios of extreme blade bending. As worst-case scenarios are intrinsically rare, the performance and efficiency of prior art wind turbines are compromised for the majority of the working life of the wind turbine. In contrast, by dynamically monitoring tip-to-tower distance, and having the ability to adjust it dynamically if required, the present invention allows smaller structural safety margins to be employed. For example, wind turbines in accordance with the present invention may have lighter, more slender and flexible blades, with less coning (smaller cone angles) and less rotor tilt than prior art wind turbines. This results in improved power performance and means that energy can be generated at lower cost. Hence, the performance and efficiency of the wind turbine can be optimised for the majority of the working life of the wind turbine, whilst still providing robust safeguards in the event of worst-case scenarios. The provision of lighter blades also results in significant savings in terms of production costs. Moreover, straighter blades (i.e. less pre-bending) may be used, which are easier to manufacture and transport.

The pressure-sensing device may include a sensor in the form of a pressure gauge. Inexpensive pressure gauges that are robust, and which do not require regular servicing, are readily available from manufacturers such as Kulite™ and Honeywell/Sensotec™ However, the sensor may be replaced and recalibrated if required as part of a scheduled service visit.

The sensor may be mounted to the tower within a hole that penetrates the tower wall. The sensor may be configured to measure the dynamic differential air pressure at the outer surface of the tower relative to the static air pressure inside the tower. In this way, the wind turbine tower performs the job of a pitot tube. Alternatively, the sensor may be mounted directly to the outer surface of the tower and configured to measure absolute air pressure. In each case, the pressure sensor may be mounted such that the point of measurement is spaced-apart from the outer surface of the tower. For example, the sensor may be located in a cradle mounted to the outer surface.

Preferably the pressure-sensing device includes four or more sensors. Four or more sensors are required to measure wind direction reliably. The sensors may be arranged at intervals around the circumference of the tower. Preferably the sensors are evenly spaced around the circumference. More preferably, a set of 12-25 sensors is used. Providing a higher number of sensors improves the resolution of the measurements and allows measured pressure curves to be fitted more accurately against standard pressure curves, for example in the determination of tip-to-tower distance as described above. A larger number of sensors also builds a degree of redundancy into the system so that the system can continue to operate efficiently if one or more sensors develops a fault.

The sensors may all be located at substantially the same height. Alternatively, the sensors may be located at multiple heights up the tower. For example, there may be two or more sensors, or arrays of sensors, in vertically spaced-apart relation. This allows wind speed and wind direction to be determined at multiple elevations up the tower if required.

The wind turbine may include a monitoring device for monitoring wind speed and/or wind direction. The monitoring device may be arranged in vertically spaced-apart relationship with the pressure-sensing device such that the wind turbine control system can monitor wind speed and/or wind direction at multiple elevations. The monitoring device is preferably located within the wake of the rotor at a level corresponding to the upper half of the rotor disc. Consequently, the wind turbine controller can optimise the performance of the upper and lower halves of the rotor disc independently. The monitoring device may be mounted above the tower, for example to the nacelle. The monitoring device may include an anemometer and/or a vane, such as the conventional device described above by way of background. The wind turbine control system may therefore supplement existing control algorithms with signals from the pressure-sensing device to achieve more sophisticated control of the wind turbine.

In addition to wind speed varying with height, as described above, wind direction may also vary or 'twist' with height. By having wind-monitoring devices in vertically spaced relation, these twists in wind direction can be monitored, and the yaw of the rotor and the pitch of the blades can be adjusted accordingly for optimal performance.

It will be appreciated that the inventive concept includes an upwind wind turbine comprising: a tower; a rotor; and first and second wind monitoring devices in vertically spaced relation. The first and second wind monitoring devices are preferably arranged to monitor wind speed and/or wind direction. The first wind-monitoring device may be a conventional device, for example an anemometer and/or a vane, and is preferably located within the wake of the rotor at a level corresponding to the upper half of the rotor disc. The second wind-monitoring device is preferably a pressure-sensing device such as that described above, which is preferably supported by the tower. The second wind-monitoring device is preferably arranged within the wake of the rotor at a level corresponding to the lower half of the rotor disc.

The inventive concept also includes a wind turbine control system for controlling a wind turbine having a tower and a rotor, wherein the wind turbine control system includes a wind turbine controller configured to receive a signal from a pressure-sensing device supported by the tower at a location within the wake of the rotor, and to utilise the signal to control the rotor.

The wind turbine controller may be configured to determine the distance to a point along a blade as the blade passes the tower, i.e. the clearance between the blade and the tower. Further, the controller may be configured to control the rotor in accordance with a constraint based upon said clearance. Preferably the point along the blade is at or close to the tip of the blade. In this way, the controller is configured to determine the tip-to-tower distance.

The controller may be configured to take action to increase the clearance between the blades and the tower if that clearance approaches or falls below a predefined minimum value or if the probability of a collision between a blade and the tower exceeds a predetermined maximum acceptable value. For example, the controller may be configured to introduce or vary a cyclic pitch pattern to reduce the lift generated by the lower part of the rotor disc.

The invention may also be expressed in terms of a method of controlling a wind turbine having a tower and a rotor, the method comprising sensing air pressure within the wake of the rotor at a level where the wake impinges upon the tower, and controlling the rotor based upon the sensed air pressure.

International (PCT) patent application WO 2008/129112 describes tower-mounted sensors. However, these sensors are positioned out of the wake of the rotor, and hence cannot detect pressure surges as the blades pass the tower or air pressure within the lower part of the rotor disc. Further, the sensors do not directly measure the speed and direction of the wind impinging upon the lower part of the rotor disc. As such, these sensors are not suitable for determining the tip-to-tower distance or for use in controlling the rotor.

Figure 2:
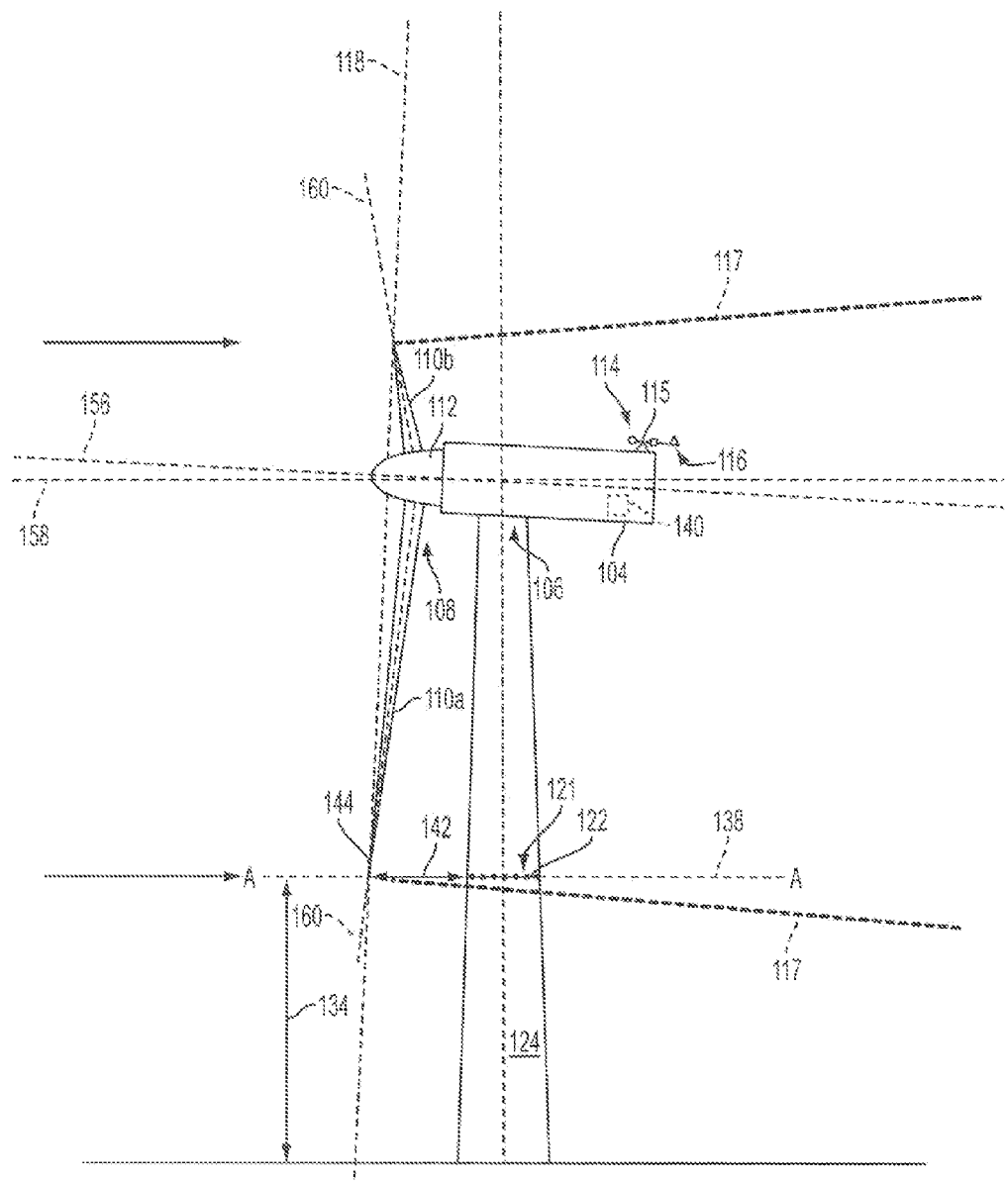
Figure 3:
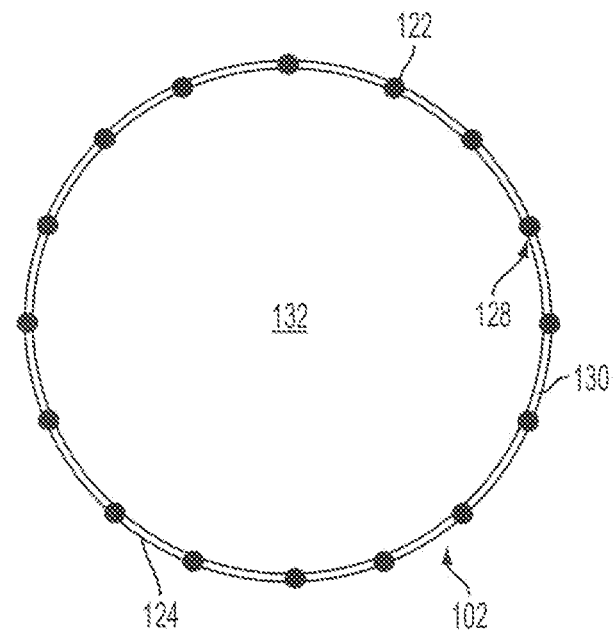
Figure 4:
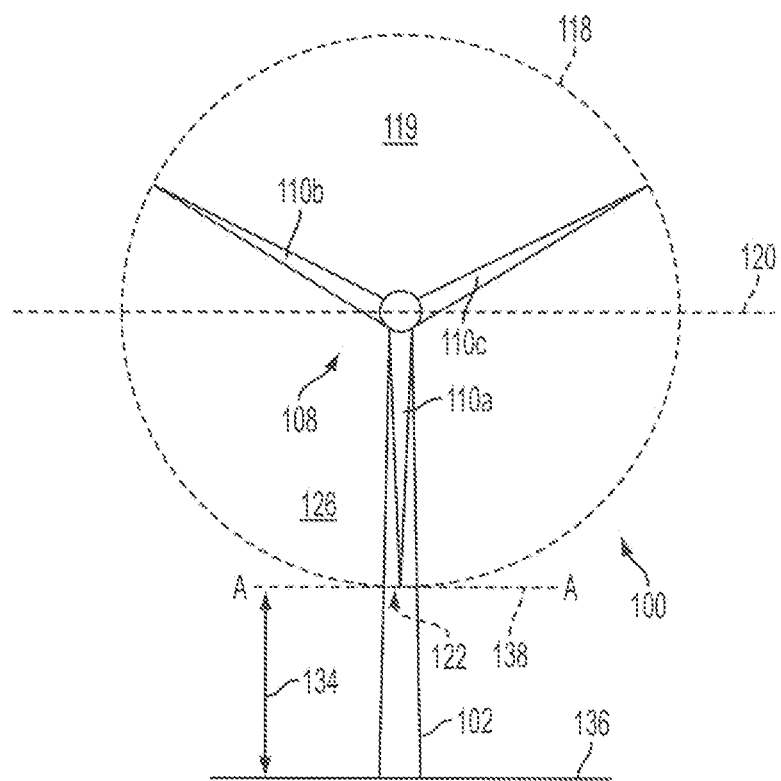
Figure 5:
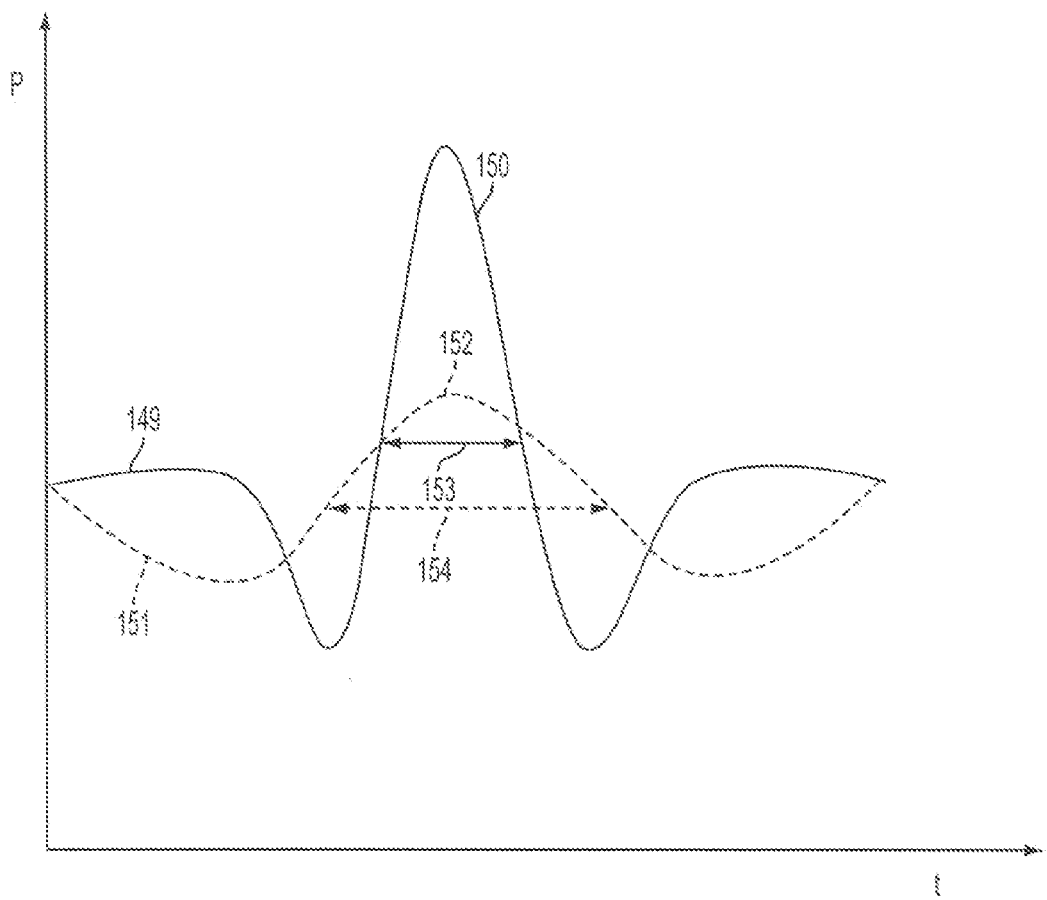
Figure 6:
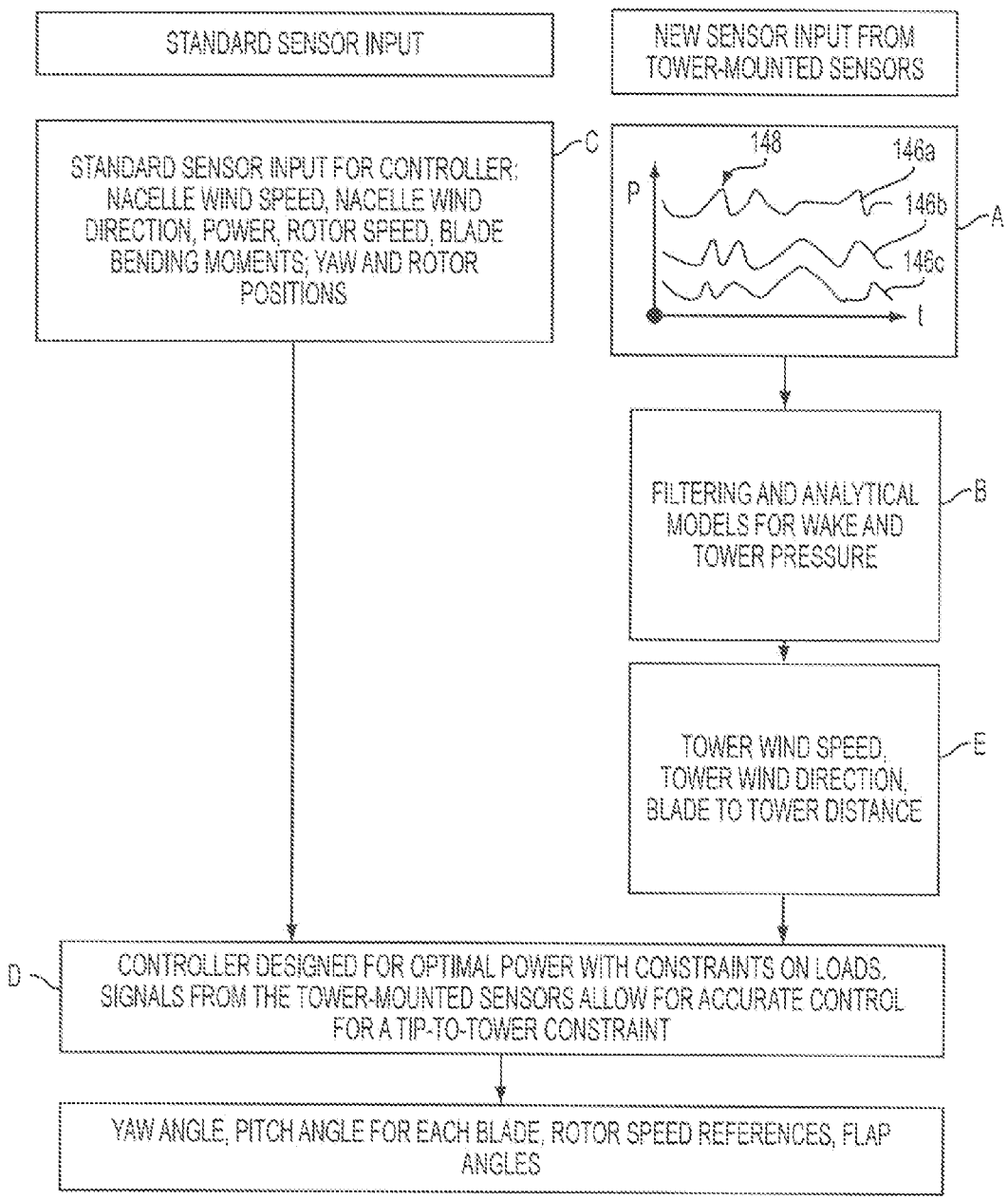

In order that the invention may be more readily understood, reference will now be made, by way of example only, to the following drawings, in which:

FIG. 2 is a schematic side view of a wind turbine in accordance with the present invention, in which a set of sensors is mounted to the tower of the wind turbine for measuring air pressure at the tower;

FIG. 3 is a schematic cross section through the wind turbine tower taken along the line A-A in FIGS. 2 and 4, and showing the set of sensors spaced around the outer circumference of the tower;

FIG. 4 is a schematic front view of the wind turbine of FIG. 2;

FIG. 5 is a plot of pressure versus time, which illustrates the effect of tip-to-tower distance on pressure signals from the sensors; and FIG. 6 is a block diagram representing how signals from the sensors are used in controlling the wind turbine of the present invention.

DETAILED DESCRIPTION

FIG. 2 shows a horizontal axis upwind wind turbine 100 comprising a tubular tower 102 supporting a nacelle 104 at its upper end 106. The nacelle 104 in turn supports a rotor 108, which includes three equally-spaced rotor blades 110a, 110b, 110c extending radially from a central hub 112 when viewed from the front as shown in FIG. 4. Again, only two blades 110a, 110b are shown in the side view of FIG. 2. A wind-monitoring device 114 including an anemometer 115 and a vane 116 is mounted above the nacelle 104. The anemometer 115 monitors wind speed, whilst the vane 116 monitors wind direction above the tower 102 within the wake 117 (FIG. 2) of the rotor 108 corresponding to an upper half of the rotor disc 118. The upper half of the rotor disc 118 is the semi-circular region 119 above the horizontal dashed line 120 in FIG. 4.

A pressure-sensing device 121 comprising an array of sensors 122 is arranged at an outer surface 124 of the tubular tower 102 within the wake 117 of the rotor 108 corresponding to the lower half of the rotor disc 118. The lower half of the rotor disc 118 is the semi-circular region 126 below the horizontal dashed line 120 in FIG. 4. In this example, there are sixteen sensors 122, which are substantially equiangularly spaced about the circumference of the tower 102, as shown in FIG. 3. Each sensor 122 comprises a pressure gauge mounted within a respective hole 128 in the outer wall 130 of the tower 102. The pressure gauges are configured to measure the dynamic air pressure at the outer surface 124 of the tower 102 relative to the static air pressure of the air 132 within the tower 102. In this way, the wind turbine tower 102 performs the job of a pitot tube.

Referring to FIG. 4, the sensors 122 are arranged at the vertical level of the lowest point of the rotor disc 118. The height of the sensors 122 is represented schematically in FIGS. 2 and 4 by the double-headed arrow 134 extending vertically between the ground 136 and the horizontal line A-A 138 through the tower 102.

Referring again to FIG. 2, the sensors 122 form part of a wind turbine control system. The wind turbine control system includes a wind turbine controller 140, which is configured to control the rotor 108 and other operations of the wind turbine 100. The wind turbine controller 140 receives signals from the anemometer 115 and vane 116, which are indicative of wind speed and wind direction at the top of the tower 102. The controller 140 also receives signals representing pressure from the sixteen sensors 122; these signals are indicative of wind speed at the tower surface 124 at the various locations of the respective sensors 122. The controller 140 is able to calculate wind speed and wind direction at the tower surface 124 by comparing signals from the various sensors 122 around the circumference of the tower 102.

The wind turbine controller 140 is also configured to determine the tip-to-tower distance based upon the signals received from the sensors 122. The tip-to-tower distance is represented schematically by the double-headed arrow 142 in FIG. 2, which extends substantially horizontally between the tip 144 of the downward-pointing blade 110a and the outer surface 124 of the tower 102. The method of determining the tip-to-tower distance 142 will now be described with reference to FIGS. 5 and 6.

Referring firstly to box A in FIG. 6, this contains a plot of pressure vs. time, and includes three lines 146a, 146b, 146c that are schematically representative of the dynamic pressure signals measured by three of the tower-mounted sensors. For tip-to-tower calculations, it is the signals from sensors 122 mounted on the side of the tower 102 facing the blades 110a, 110b, 110c that are of most relevance. The dynamic pressure plots 146a, 146b, 146c are recorded by the wind turbine control system and include a series of local pressure peaks, one of which is indicated by reference numeral 148 in box A. Each peak corresponds to a surge in pressure as a blade passes the tower.

The tip-to-tower distance 142 (FIG. 2) can be inferred from the shape and amplitude of these pressure peaks 148. In general, as tip-to-tower distance 142 decreases, the measured pressure peaks 148 will become sharper and have increased amplitude.

Hence, relatively broad, low amplitude pressure peaks are detected for relatively large tip-to-tower distances, whilst relatively narrow, high-amplitude peaks are detected for relatively small tip-to-tower distances.

This principle is illustrated in FIG. 5, in which the solid line 149 represents schematically a pressure peak 150 measured for a relatively small tip-to-tower distance, whilst the dashed line 151 represents schematically a pressure peak 152 measured for a relatively large tip-to-tower distance. The peak 150 of the solid line 149 has a higher amplitude and is narrower than the corresponding peak 152 of the dashed line 151. In this example, the width or duration of the peaks 150, 152 can be compared by comparing the 'full width at half maximum' (FWHM) of the peaks, as indicated by the double-headed arrows 153, 154 in FIG. 5. The FWHM 153 of the solid line 149 is less than the FWHM 154 of the dashed line 151.

Aside from the tip-to-tower distance 142, the shape of a pressure peak is also affected by other factors, including wind speed, rotor speed and pitch angle. The wind turbine controller 140 accesses a parametric model that stores correlations between the shape of the pressure peaks (e.g. amplitude and FWHM) and the tip-to-tower distance 142 for numerous combinations of rotor speed, pitch angle, and the wind speed at the tower 102 measured by the array of sensors 122. The parametric model is stored in a database, which is part of the wind turbine control system.

The tip-to-tower distance 142 is obtained from the parametric model with knowledge of the amplitude and FWHM of a pressure peak, and knowledge of the rotor speed and pitch angle, which are standard parameters monitored by the wind turbine control system. Wind direction can also affect the amplitude of pressure peaks. Therefore, in other embodiments of the invention, the parametric model may also store correlations between the shape of the pressure peaks and the wind direction at the tower 102 measured by the array of sensors 122.

The signals from the tower-mounted sensors 122 are employed to increase the sophistication of wind turbine control as described below with reference to FIG. 6.

FIG. 6 includes two strands: the first strand, to the left of FIG. 6, represents 'standard' sensor input, i.e. standard parameters that are monitored by existing sensors in a typical known wind turbine control system, whilst the second strand, to the right of FIG. 6, represents the additional signals from the tower-mounted sensors 122. Examples of standard parameters that are monitored in existing wind turbine control systems are listed in box C. These parameters may typically include the wind speed and wind direction at the nacelle (monitored by the anemometer); the rotor speed; blade bending moments (monitored by blade-mounted sensors); yaw and rotor positions; and the power generated by the wind turbine. Signals indicative of these parameters are sent from the various standard sensors to the wind turbine controller (Box D).

In addition to the standard signals, the controller 140 receives signals indicative of wind speed and wind direction at the tower 102, and may additionally receive readings of the tip-to-tower distance 142 (Box E). These signals are obtained from the tower-mounted sensors 122. However, as these sensors are operating in the wake 117 of the rotor 108, the actual pressure readings (Box A) from these sensors 122 will include some instability and turbulence effects caused by the blades 110a, 110b, 110c. These signals are filtered and/or corrected (Box B) to remove the turbulent effects in order to obtain the ambient wind speed and wind direction at the tower 102. Suitable filtering and correction techniques for this purpose would be readily apparent to the person skilled in the art, and are employed in existing wind turbine control systems to filter signals from the anemometer 115, which also operates in the wake 117 of the rotor 108.

The wind turbine controller 140 utilises the filtered signals from the tower-mounted sensors 122, together with the standard signals (Box C), to control the rotor to provide optimal power within predefined load constraints. To this end, for example, the wind turbine control system may dynamically vary the pitch of the blades, the rotor speed, and/or the flap angles if flaps are provided on the blades.

The signals from the tower-mounted sensors 122 allow the rotor 108 to be controlled within a tip-to-tower constraint. The wind speed and direction information from the pressure sensors 122 at the tower 102 can be used with the other sensor information in the controller 140 to predict average values and variability for blade deflections towards the tower 102. The readings for the actual distance between the blades 110a, 110b, 110c and the tower 102 each time a blade passes the tower 102 can be used together with the predictions to determine accurate values of the actual variability of blade deflections and hence the probability of a future blade/tower collision.

If the tip-to-tower distance 142 becomes too small, then the probability of a blade colliding with the tower 102 becomes too high. In such circumstances, the wind turbine control system can take action to increase the tip-to-tower distance 142. For example, the target power setting for the wind turbine 100 may be reduced, an individual pitching strategy for each blade or a cyclic pitching strategy may be introduced, or if already introduced it may be adapted, to reduce the lift of the blades 110a, 110b, 110c in the lower half of the rotor disc 118. Typical maximum allowable probabilities for hitting the tower can be established according to the well established standard from the International Electrotechnical Commission IEC 61400-1, Wind turbines, Part 1: Design Requirements.

Figure 1:
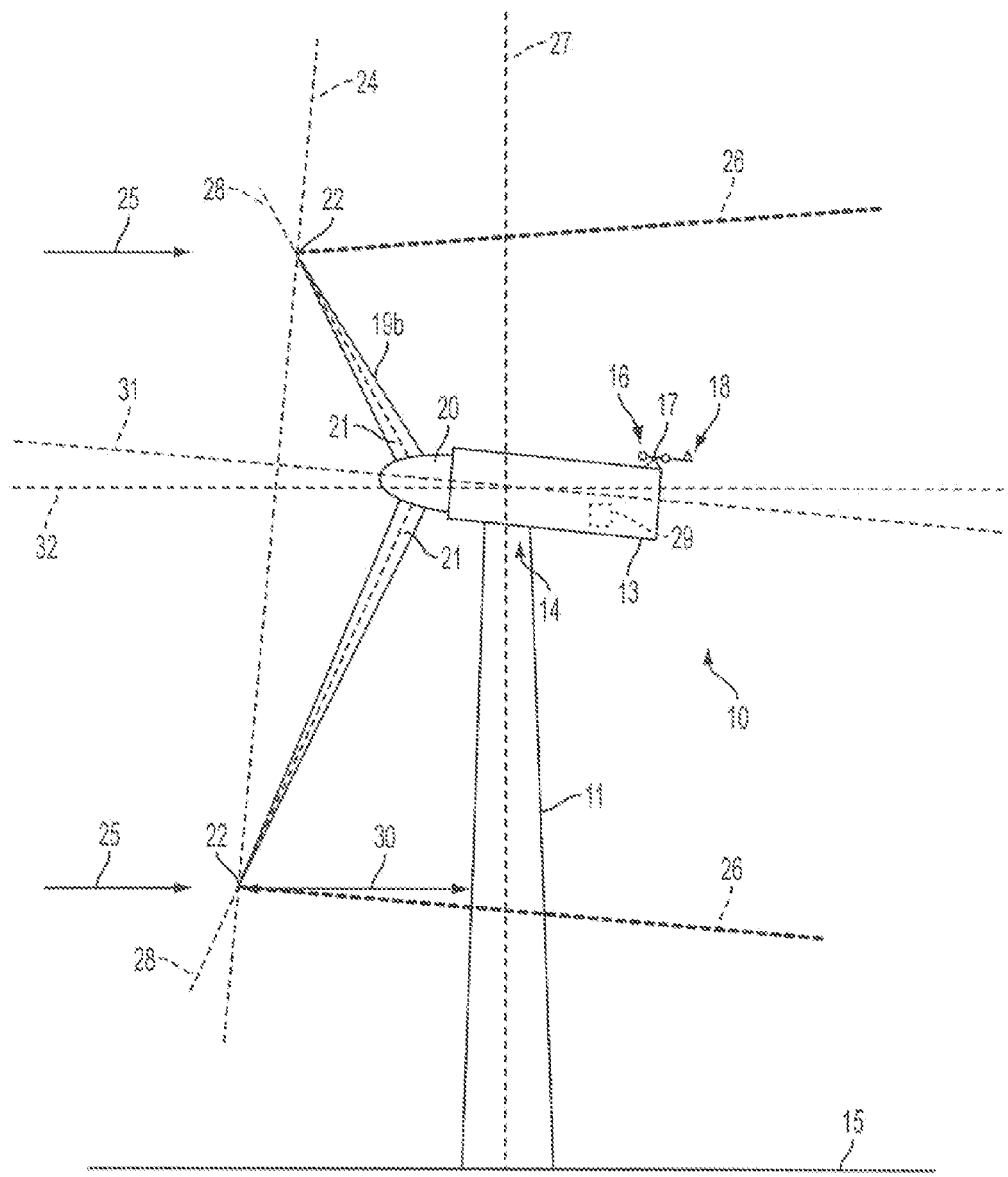
FIGS. 1 and 1A, which are, respectively, schematic side and front views of a prior art wind turbine, have already been described above by way of background to the invention.
Figure 1A:
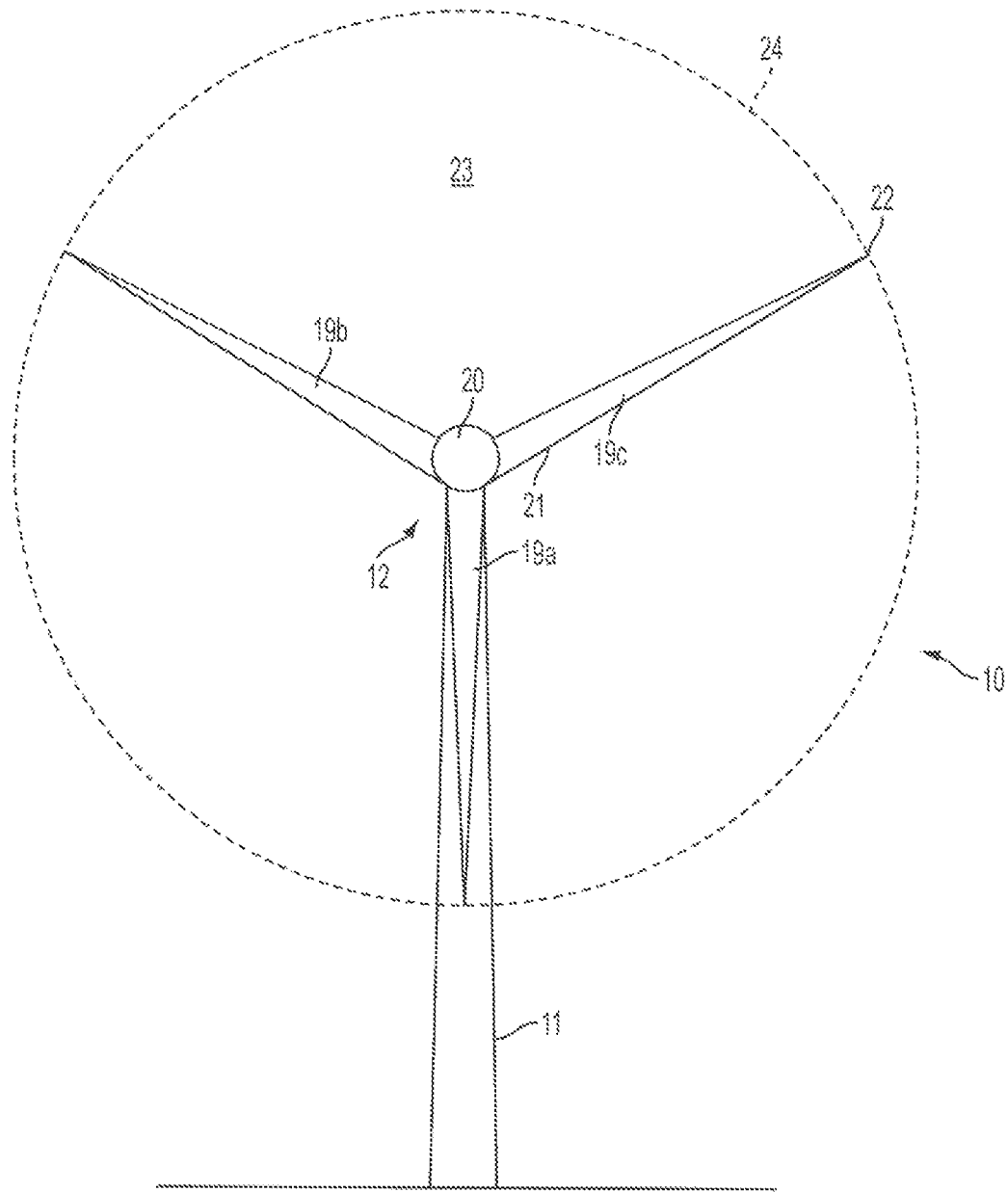

As tip-to-tower distance 142 is monitored dynamically, and action can be taken to increase the tip-to-tower distance 142 if required, it is not necessary to compromise the performance of the wind turbine 100 by introducing structural features to safeguard against blade-tower collisions. Hence, the present invention allows wind turbines to be constructed with reduced rotor tilt, coning, and blade prebending. Hence, the wind turbine 100 of the present invention shown in FIG. 2 has a smaller tilt angle (the angle between the rotor axis 156 and the horizontal 158) and a smaller cone angle (the angle between the longitudinal axes 160 of the blades 110a, 110b, 110c along the span direction, and the rotor disc 118) than the prior art wind turbine shown in FIG. 1. This improves the performance and efficiency of the wind turbine 100. The present invention also allows lighter, more flexible blades to be used, which are less expensive and easier to manufacture and transport.

It will be appreciated that various modifications may be made to the examples described above without departing from the scope of the invention as defined by the accompanying claims. For example, it will be appreciated that the sensors 122 may be located at a height other than that shown in FIG. 2. Provided that pressure surges can be detected as the blades pass the tower, the tip-to-tower distance 142 can be inferred. Also, whilst the sensors 122 in FIG. 2 are all located at the same height, it will be appreciated that the sensors may be spaced apart vertically in other embodiments in order to measure pressure, and hence wind speed and wind direction, at multiple elevations up the tower 102. This allows even more sophisticated control of the rotor 108 to be achieved. Further, it will be appreciated that other types of sensors may be employed for determining the tip-to-tower distance, for example distance sensors based upon acoustic or optical principles.

The invention claimed is:

1. An upwind wind turbine comprising:
   a tower;
   a rotor; and
   a pressure sensing device disposed on the tower at a location within the wake of the rotor at a level corresponding to the lower half of a rotor disc defined by rotation of the rotor, the pressure sensing device configured to sense air pressure within the wake of the rotor and provide a signal indicative of the sensed air pressure to a wind turbine controller for use in controlling the rotor of the wind turbine.

2. The upwind wind turbine of claim 1, wherein the pressure-sensing device is at least as far from a rotor axis as a longitudinal midpoint of a rotor blade.

3. The upwind wind turbine of claim 1, wherein the pressure-sensing device is mounted at a height substantially corresponding to the height of the lowest point of a rotor disc defined by rotation of the rotor.

4. The upwind wind turbine of claim 1, wherein the pressure-sensing device includes a plurality of sensors.

5. The upwind wind turbine of claim 4, wherein the sensors are spaced around the circumference of the tower.

6. The upwind wind turbine of claim 4, wherein two or more sensors are vertically spaced apart.

7. The upwind wind turbine of claim 1, further comprising a monitoring device for monitoring wind speed and/or wind direction, the monitoring device being vertically spaced apart from the pressure-sensing device.

8. The upwind wind turbine of claim 7, wherein the monitoring device is located within the wake of the rotor at a level corresponding to an upper half of a rotor disc defined by rotation of the rotor.

9. A method of controlling a wind turbine having a tower and a rotor, the method comprising sensing air pressure within the wake of the rotor at a location where the wake impinges upon the tower at a level corresponding to the lower half of a rotor disc defined by rotation of the rotor, and controlling the rotor based upon the sensed air pressure.

10. The method of claim 9, further comprising controlling the rotor based upon wind speed and/or wind direction within the wake of the rotor at a level corresponding to an upper half of the rotor disc.

11. The method of claim 9, further comprising determining the clearance between the tower and a point along a rotor blade as the blade passes the tower.

12. The method of claim 11, further comprising monitoring surges in the sensed pressure as a blade passes the tower and inferring the clearance from characteristics associated with said surges.

13. The method of claim 11 further comprising increasing the clearance in the event that it approaches or falls below a predefined minimum value or if the probability of a collision between a blade and the tower exceeds a predetermined maximum acceptable value.

14. The method of claim 11, further comprising introducing or varying a cyclic pitch pattern of the rotor blades to reduce the lift generated in the lower part of the rotor disc in the event that the clearance approaches or falls below a predefined minimum value or if the probability of a collision between a blade and the tower exceeds a predetermined maximum acceptable value.

15. A wind turbine control system for controlling a wind turbine having a tower and a rotor, wherein the wind turbine control system includes a wind turbine controller configured to receive a signal indicative of a sensed air pressure from a pressure-sensing device disposed on the tower at a location within the wake of the rotor at a level corresponding to the lower half of a rotor disc defined by rotation of the rotor, and to utilise the signal to control the rotor.

16. The wind turbine control system of claim 15, further including a monitoring device for monitoring wind speed and/or wind direction within the wake of the rotor at a level corresponding to an upper half of the rotor disc, wherein the controller is configured to control the rotor in accordance with signals from the monitoring device and signals from the pressure-sensing device.

17. The wind turbine control system of claim 15, wherein the controller is configured to monitor peaks in the signal from the pressure-sensing device, the peaks corresponding to surges in pressure as a blade passes the tower, and to determine, based upon characteristics of the peaks, the clearance between the tower and a point along a rotor blade, for example the tip of the blade, as the blade passes the tower.

18. The wind turbine control system of claim 17, wherein the controller accesses a model correlating the characteristics of the peaks with values for the clearance.

19. The wind turbine control system of claim 17, wherein the controller is configured to maintain the clearance within predefined limits and/or to maintain the probability of a collision between a blade and the tower below a predetermined maximum acceptable value.

\* \* \* \* \*